United States Patent [19]
Menne et al.

[11] 3,820,227
[45] June 28, 1974

[54] CUTTER HEAD AND METHOD OF FORMING SAME

[75] Inventors: Joseph D. Menne, Canton; George N. Sigulas, Peoria, both of Ill.

[73] Assignee: Caterpillar Tractor Co., Peoria, Ill.

[22] Filed: Dec. 21, 1972

[21] Appl. No.: 317,162

[52] U.S. Cl.................... 29/445, 76/101 R, 90/1, 29/464
[51] Int. Cl............................................. B23p 13/00
[58] Field of Search............. 29/445, 464; 76/101 R, 76/101 A

[56] References Cited
UNITED STATES PATENTS

| | | | |
|---|---|---|---|
| 2,348,908 | 5/1944 | Jacobs | 29/445 |
| 2,398,564 | 4/1946 | Stoner | 29/445 X |
| 2,616,162 | 11/1952 | Sundt | 29/445 X |

*Primary Examiner*—Leonidas Vlachos
*Attorney, Agent, or Firm*—Phillips, Moore, Weissenberger, Lempio & Strabala

[57] ABSTRACT

A cutter head for a gear cutting machine of the type wherein a plurality of cutting tools are mounted in radially movable and circumferentially spaced relation upon the head, the cutter head being formed from an annular pressure plate, a plurality of uniformly dimensioned, wedge-shaped tool slot separators and a plurality of uniformly dimensioned, generally rectangular tool slot spacers alternately arranged upon the annular pressure plate to form slots for receiving the cutting tools, the separators and spacers being heat treated prior to assembly upon the annular pressure plate, the separators and spacers being accurately positioned upon the pressure plate by alignment dowels surrounded by soft metal plugs and extending through coaxial bores in the pressure plate and the respective separators and spacers.

2 Claims, 4 Drawing Figures

CUTTER HEAD AND METHOD OF FORMING SAME

BACKGROUND OF THE INVENTION

The present invention relates to gear cutting machines of the type wherein a plurality of cutting tools are movably mounted in radial slots formed in a cutter head. In this type of machine, the cutter head is moved axially with respect to a gear blank and the cutting tools are gradually moved radially inwardly until the desired depth of cut is achieved.

Heretofore, the cutter heads have been formed as integral structures with the tool slots being machined into the head, the head then being heat treated to achieve the desired hardness.

Cutter heads formed by this method are relatively expensive due to the substantial machining required. In addition, excessive stress risers or concentrations tend to be formed during heat treating because of the unequal sections and radii in the cutter head.

SUMMARY OF THE INVENTION

Accordingly, it is an object of the present invention to provide a cutter head design and a method of forming a cutter head which overcome one or more of the problems set forth above.

It is a particular object of the present invention to form such a cutter head from an annular pressure plate, a plurality of uniformly dimensioned tool slot separators and a plurality of uniformly dimensioned tool slot spacers which are separately heat treated prior to assembly in order to minimize stress concentrations.

It is a further object of the further invention to provide a cutter head and a method of forming a cutter head for a gear cutting machine wherein assembly of the cutter head is simplified with the separators and spacers being accurately positioned on the pressure plate by alignment dowels surrounded by soft metal plugs extending through coaxial bores in the pressure plate and the respective separators and spacers.

Additional objects and advantages of the present invention are made apparent in the following description having reference to the accompanying drawings.

DESCRIPTION OF A PREFERRED EMBODIMENT

Figure 1:
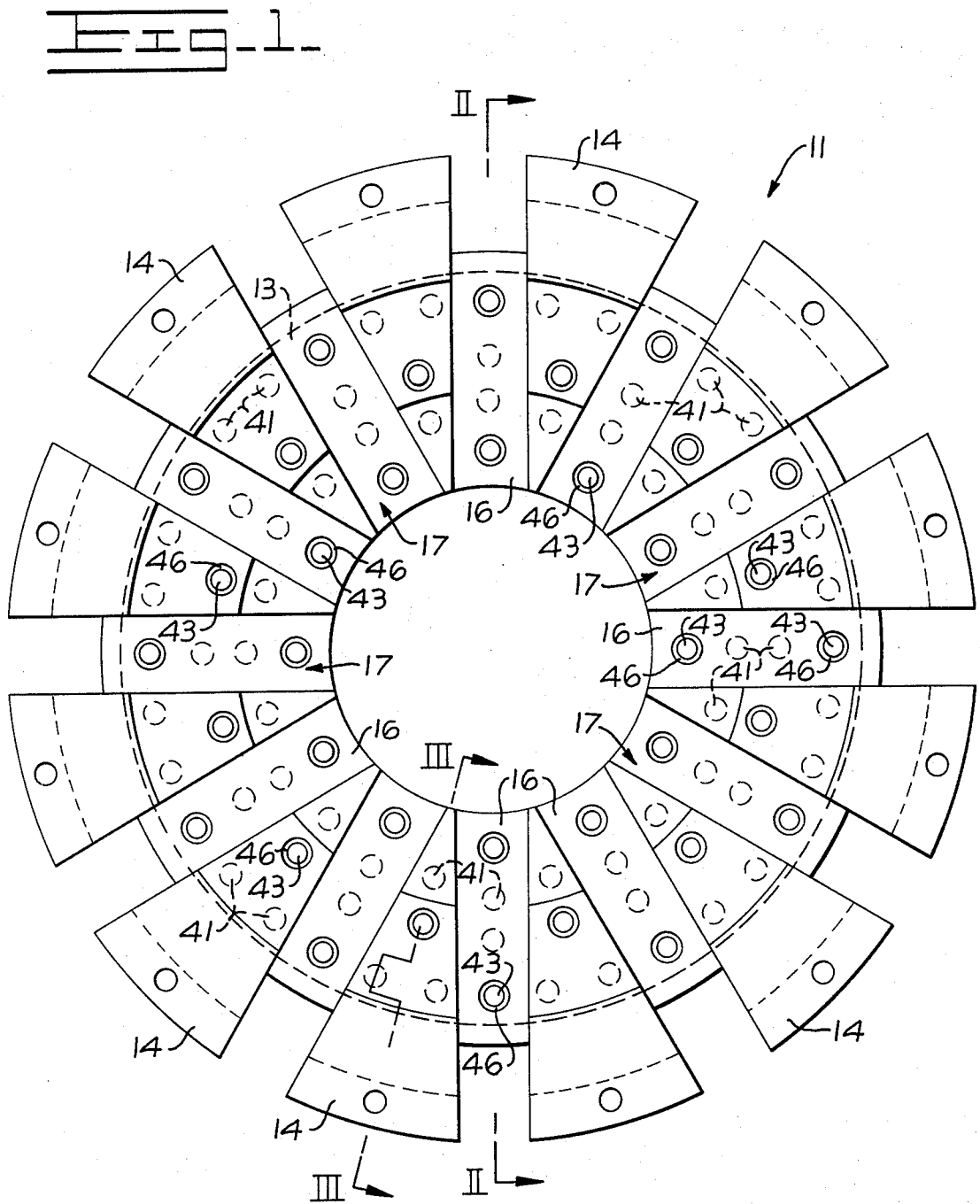
FIG. 1 is a plan view of a cutter head according to the present invention.
Figure 2:
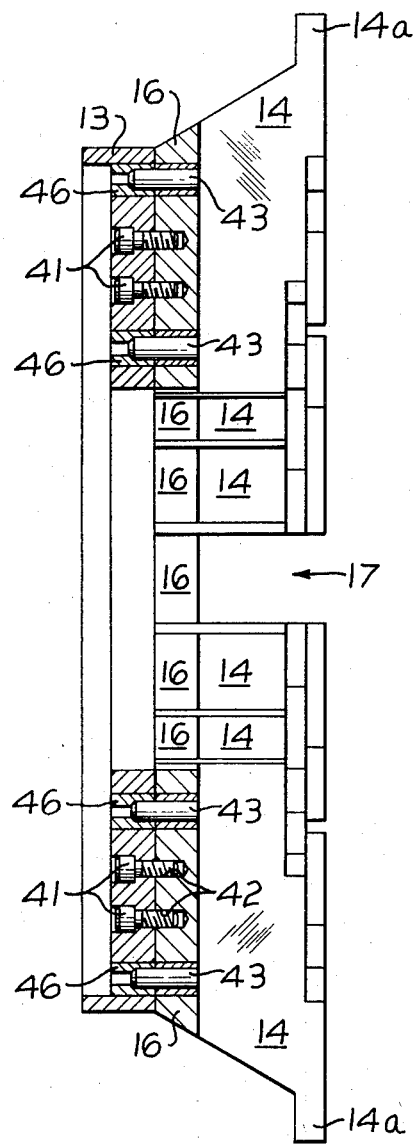
FIG. 2 is a view taken along section lines II—II of FIG. 1.
Figure 3:
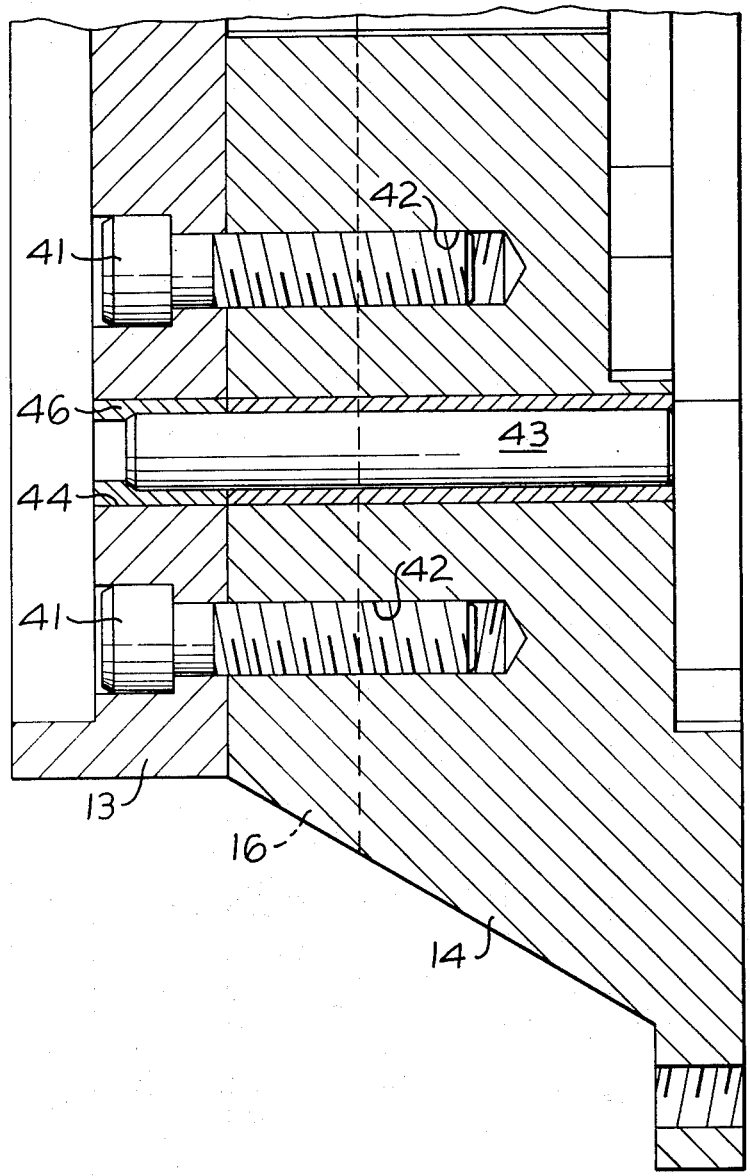
FIG. 3 is a view taken along section line III—III of FIG. 1.

Referring now to the drawings, FIGS. 1-3 illustrate a cutter head 11 constructed according to the present invention. The cutter head 11 is preferably employed in a gear cutting machine of the type illustrated in FIG. 4. In such a machine, the cutter head supports a plurality of cutting tools in radially movable relation for forming a gear from a workpiece such as that indicated at 12 in FIG. 4.

Details of the gear cutting machine other than the cutter head are not critical to the present invention since the invention is directed particularly toward the cutter head and its method of construction. However, a brief description of the gear cutting machine is set forth below to provide a better understanding of the cutter head.

Referring to FIGS. 1-3, the cutter head 11 of the present invention is formed from an annular pressure plate 13 with tool slot separators 14 and tool slot spacers 16 being alternately arranged upon the pressure plate 13 to form a plurality of slots 17 above the respective tool slot spacers (See FIG. 2). A cutting tool is movably mounted in each of the slots 17. Cutting tools mounted within the slots 17 are illustrated for example at 21 in FIG. 4.

Referring again particularly to FIG. 4, the assembled cutter head 11 is bolted to a head plate 22 after which the cutting tools 21 are arranged in the slots 17. Note that the tool slot separators 14 each form a mounting bracket 14a by which the cutter head 11 is secured to the head plate 22. The cutter head 11 and head plate 22 are then placed in the headstock 23 of the gear cutting machine in abutting relation with an adapter 24 which is attached to the lower end of a cutter head support 26. The cutter head 11 and head plate 22 are held in place within the headstock by means of a retaining ring 27 bolted to the lower end of the headstock unit.

The entire headstock 23 is vertically movable for replacement of the tools 21, cutter head 11 or for the insertion or removal of the workpiece or gear blank 12. When the headstock 23 is lowered into the work position illustrated in FIG. 4, the headstock housing 28 remains fixed and thus establishes the vertical position of the cutter head 11.

The workpiece 12 is attached to a reciprocable ram which is partially indicated at 31. The workpiece is alternately raised and lowered past the cutting tools 21 during the machining or cutting operation.

Figure 4:
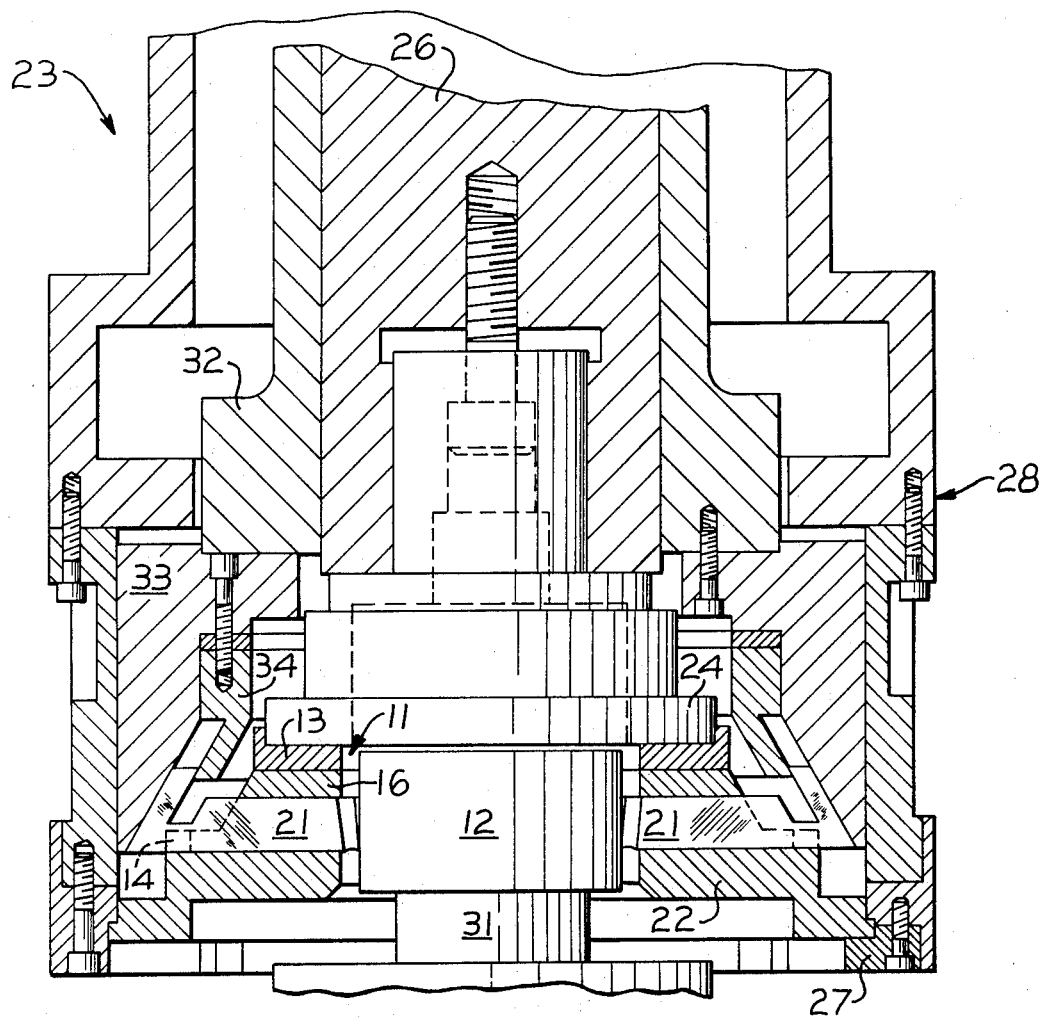
FIG. 4 is a fragmentary view with parts in section of a gear cutting machine of the type in which the present cutter head may be employed.

The radial position of the cutters 21 is controlled by a reciprocable feed connection or sleeve 32 carrying a feed cone member 33 and retractor ring 34. The reciprocable sleeve 32 is connected to and synchronized with the reciprocable ram 31 for example by a conventional cam-and-rachet type interconnection (not shown). Because of the interconnection with the reciprocable ram, the sleeve 32, feed cone 33, and retractor ring 34, as viewed in FIG. 4 are moved downwardly an incremental amount prior to each cutting stroke so that the tools 21 are advanced radially inwardly to accomplish a somewhat deeper cut during each successive cutting stroke. Sleeve 32 is moved upwardly by the cam-and-rachet interconnection at the end of each cutting stroke, thus the retractor ring 34 causes tools 21 to be moved radially outward and out of contact with workpiece 12 as it is lowered by ram 31 during the return stroke.

Referring now to FIGS. 1-3, the pressure plate 13 is annularly formed to provide a central passage for receiving the workpiece 12. The pressure plate is also recessed to facilitate its mounting upon the adapter 24. As noted above, the cutter head also comprises a plurality of tool slot separators 14 which are of uniformly dimensioned, wedge-shaped construction and a plurality of tool slot spacers 16 which are also uniformly dimensioned and are of generally rectangular configuration. It may be noted that with the tool slot separators and spacers being circumferentially arranged about the pressure plate 13, the inner surfaces of the separators and spacers are curved to provide a circular opening through the assembled cutter head 11.

The uniform dimensions of both the spacers and separators is of particular importance to the present invention since the separately formed separators and spacers may be selectively heat treated along with the pressure plate 13 to minimize the formation of stress risers or concentrations in the parts. It may be seen by referring to FIG. 2, for example, that the assembled cutter head has portions of substantially varying thickness. In the prior art, where the entire cutter head has been integrally formed and heat treated as a unit, the unequal sections and radii of the head have caused the formation of substantial stress risers which have resulted in early fatigue cracking of the cutter head. According to the present invention, the pressure plate, the respective separators and the respective spacers are of substantially uniform thickness to permit selective heat treatment according to their respective sizes and material.

The pressure plate 13, the tool slot separator 14 and the tool slot spacers 16 are all preferably formed or fabricated from No. 16 pressure die steel.

Also referring to FIGS. 2 and 3, it may be seen that the pressure plate, the separators and the spacers have holes penetrating completely or partly therethrough to facilitate mounting of the separators and spacers upon the pressure plate. The holes are drilled and tapped as necessary prior to heat treatment with the holes being plugged for example with clay during heat treatment to prevent the threads from becoming brittle.

Another feature of the present invention relates to the manner in which the tool slot separators and spacers are maintained in accurate alignment upon the pressure plate. This feature of the invention is particularly important since it is necessary to maintain the cutting tools 21 in accurate alignment within the gear cutting machine illustrated in FIG. 4.

The separators and spacers are preferably positioned and secured to the pressure plate by cap screws 41 which are threaded into tapped bores 42. The separators and spacers are held accurately positioned upon the pressure plate 13 by means of alignment dowels indicated for example at 43 for both the separators and spacers. The alignment dowels 43 are arranged in oversized bores 44 which pass through the pressure plate and the respective separators and spacers. Soft metal plugs 46, for example of mild steel, are pressed into the oversized bores with holes then being drilled in the plugs to receive the alignment dowels.

Through the above-described procedure, the cutter head may be accurately assembled from the various parts including the pressure plate 13, the tool slot separators 14 and the tool slot spacers 16. The various parts are heat treated prior to assembly as described above. The separators and spacers are loosely bolted to the pressure plate by the cap screws 41. The separators and spacers are then precisely located in circumferentially abutting relation and radial orientation in order to accurately form the radial tool slots 17. To facilitate such location of the separators and spacers, the bores in pressure plate 13 for receiving mounting bolts 41 are approximately 0.015 inches oversize with respect to the bolt diameters. After alignment of the separators and spacers, the mounting bolts 41 are tightened. The soft metal plugs are then pressed into the oversized bores and drilled to receive the dowels 43 which insure that alignment is maintained.

After mounting bolts 41 are tightened and the alignment dowels 43 are in place, the assembled cutter head 11 is subjected to a finish-grinding operation.

Thus, the present invention provides a particularly simple and effective method for forming an improved cutter head of the type described above for use within a gear cutting machine of the type illustrated in FIG. 4.

What we claim is:

1. In a method of forming a cutter head for a cutting machine of the type wherein a plurality of circumferentially spaced cutting tools are radially arranged on the head, the steps comprising
    forming an annular pressure plate, a plurality of uniformly dimensioned, wedge-shaped tool slot separators and a plurality of uniformly dimensioned, generally rectangular tool slot spacers,
    mounting the separators and spacers in alternately abutting relation upon the annular pressure plate,
    aligning the separators and spacers upon the pressure plate,
    inserting soft metal plugs into oversize bores passing through the pressure plate and the respective separators and spacers, and
    drilling through the soft metal plugs and inserting alignment dowels therein.

2. The method of claim 1 wherein the pressure plate, the uniformly dimensioned tool slot separators and the uniformly dimensioned tool slot spacers are heat treated prior to assembly in order to minimize stress concentrations.

* * * * *